(12) United States Patent
Yan et al.

(10) Patent No.: US 8,995,835 B2
(45) Date of Patent: Mar. 31, 2015

(54) INVERSE CHANNEL APPARATUS AND TRANSMITTER, RECEIVER AND SYSTEM CONTAINING THE APPARATUS

(71) Applicant: Fujitsu Limited, Kawasaki-shi, Kanagawa (JP)

(72) Inventors: Weizhen Yan, Beijing (CN); Zhenning Tao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 129 days.

(21) Appl. No.: 13/785,366

(22) Filed: Mar. 5, 2013

(65) Prior Publication Data

US 2013/0243433 A1 Sep. 19, 2013

(30) Foreign Application Priority Data

Mar. 16, 2012 (CN) .......................... 2012 1 0071581

(51) Int. Cl.
*H04J 14/06* (2006.01)
*H04B 10/00* (2013.01)
*H04B 10/2507* (2013.01)
*H04B 10/2543* (2013.01)

(52) U.S. Cl.
CPC ........ *H04B 10/2507* (2013.01); *H04B 10/2543* (2013.01)
USPC .............................. 398/65; 398/119; 398/128

(58) Field of Classification Search
CPC ........ H04B 10/00; H04B 10/04; H04B 10/06; H04J 14/00; H04J 14/06
USPC ........................................... 398/65, 119, 128
See application file for complete search history.

(56) References Cited

U.S. PATENT DOCUMENTS

| 5,226,060 | A  | * | 7/1993 | Goodson et al. | ............... 375/232 |
| 7,098,734 | B2 | * | 8/2006 | Hongo et al. | ................. 330/149 |
| 7,266,310 | B1 | * | 9/2007 | Savory et al. | ................. 398/205 |
| 2002/0064236 | A1 | * | 5/2002 | Matsuoka et al. | ............ 375/296 |
| 2005/0163268 | A1 | * | 7/2005 | McCallister | ................... 375/346 |
| 2005/0210354 | A1 | * | 9/2005 | Kurokami | ..................... 714/747 |
| 2007/0147541 | A1 | * | 6/2007 | Saito | ............................. 375/297 |

(Continued)

OTHER PUBLICATIONS

Ezra M. Ip et al., "Fiber Impairment Compensation Using Coherent Detection and Digital Signal Processing", Journal of Lightwave Technology, IEEE, pp. 502-519.

(Continued)

*Primary Examiner* — David Payne
*Assistant Examiner* — Pranesh Barua
(74) *Attorney, Agent, or Firm* — Staas & Halsey LLP

(57) ABSTRACT

The embodiments provide an inverse channel apparatus and transmitter, receiver and system containing the apparatus; wherein the inverse channel apparatus comprises: an inverse nonlinear calculating unit configured to perform nonlinear additive calculation and nonlinear multiplicative calculation on input signals, so as to obtain signals containing nonlinear damage of the input signals on at least one polarization state; and an inverse linear calculating unit configured to calculate signals containing nonlinear damage and linear damage of the input signals on at least one polarization state according to the signals containing nonlinear damage of the input signals on at least one polarization state and a linear function of a channel. The advantages of the embodiments exist in that a transmitted signal is recovered by being passed through an inverse channel after or before being transmitted in a practical channel, thereby effectively compensating for intra-channel nonlinear damage of an optical fiber communication system.

9 Claims, 4 Drawing Sheets

(56) References Cited

U.S. PATENT DOCUMENTS

| | | | |
|---|---|---|---|
| 2009/0190926 A1* | 7/2009 | Charlet et al. | 398/74 |
| 2009/0291650 A1* | 11/2009 | Singerl et al. | 455/114.3 |
| 2010/0046961 A1* | 2/2010 | Tanimura et al. | 398/159 |
| 2010/0130134 A1* | 5/2010 | Tamura et al. | 455/63.1 |
| 2010/0196009 A1* | 8/2010 | Qian et al. | 398/65 |
| 2010/0239262 A1 | 9/2010 | Li et al. | |
| 2011/0013911 A1* | 1/2011 | Alexander et al. | 398/79 |
| 2011/0064155 A1* | 3/2011 | Ashita | 375/260 |
| 2011/0255879 A1* | 10/2011 | Xie et al. | 398/208 |
| 2012/0099860 A1* | 4/2012 | Zami et al. | 398/45 |
| 2012/0127009 A1* | 5/2012 | Pagnanelli | 341/143 |
| 2012/0148265 A1* | 6/2012 | Chang et al. | 398/208 |
| 2012/0213530 A1* | 8/2012 | Stojanovic | 398/194 |
| 2012/0224846 A1* | 9/2012 | Swanson et al. | 398/13 |
| 2013/0039665 A1* | 2/2013 | Hauske | 398/202 |
| 2013/0308960 A1* | 11/2013 | Horikoshi et al. | 398/209 |

OTHER PUBLICATIONS

Extended European Search Report mailed Jul. 11, 2013 in corresponding European Application No. 13158130.8.

Shuxian Song et al., "Numerically Reversing the Nonlinear Wave Propagation in Single-Mode Optical Fiber", IEEE LEOS 12$^{th}$ Annual Meeting Conference Proceedings, LEOS'99, IEEE, vol. 2, Nov. 8, 1999, pp. 611-612.

Ling Liu et al., "Intrachannel Nonlinearity Compensation by Inverse Volterra Series Transfer Function", Journal of Lightwave Technology, vol. 30, No. 3, Feb. 1, 2012, pp. 310-316.

Ezra IP et al., "Compensation of Dispersion and Nonlinear Impairments Using Digital Backpropagation", Journal of Lightwave Technology, vol. 26, No. 20, Oct. 15, 2008, pp. 3416-3425.

* cited by examiner

INVERSE CHANNEL APPARATUS AND TRANSMITTER, RECEIVER AND SYSTEM CONTAINING THE APPARATUS

CROSS-REFERENCE TO RELATED APPLICATIONS

This application claims priority to Chinese Patent Application No. 201210071581.9 filed on Mar. 16, 2012, which is incorporated herein by reference in its entirety.

TECHNICAL FIELD

The present invention relates to optical communication, and in particular to an inverse channel apparatus and transmitter, receiver and system containing the apparatus, for nonlinear compensation in an optical communication system.

BACKGROUND ART

Phase noise and waveform damage caused by intra-channel nonlinearity are one of the sources leading to cost of a long-haul transmission optical communication system. In a coherent optical communication system, digital pre-distortion (DPD) of a transmitter (document of L. Dou et al, OFC2011, paper OThF5) or digital Back-propagation (DBP) of a receiver (document of W. Yan et al., ECOC2011, paper Tu.3.A.2) may be used to compensate for the intra-channel nonlinearity damage.

In the implementation of the present invention, the inventors found that the ideas of these methods are focused on the calculation of nonlinearity damage of the whole or part of the channel, and the nonlinearity damage is eliminated by an operation of subtraction or phase modulation. Hence, there exists a problem of low performance due to incorrect calculation.

It should be noted that the above introduction to the background art is given for the clear and complete description of the technical solution of the present invention and for the understanding by those skilled in the art. The above technical solutions should not be deemed as being known to those skilled in the art for having been described in the background art of the present invention.

SUMMARY OF THE INVENTION

The object of the embodiments of the present invention is to provide an inverse channel apparatus and transmitter, receiver and system containing the apparatus, by which a transmitted signal is recovered by being passed through an inverse channel after or before being transmitted in a practical channel, so as to eliminate damage in the channel.

According to an aspect of the present invention, there is provided an inverse channel apparatus, comprising:

an inverse nonlinear calculating unit configured to perform nonlinear additive calculation and nonlinear multiplicative calculation on input signals, so as to obtain signals containing nonlinear damage of the input signals on at least one polarization state; and an inverse linear calculating unit configured to calculate signals containing nonlinear damage and linear damage of the input signals on at least one polarization state according to the signals containing nonlinear damage of the input signals on at least one polarization state and a linear function of a channel.

According to another aspect of the present invention, there is provided a receiver, comprising one or a plurality of the inverse channel apparatuses, wherein when the receiver comprises one inverse channel apparatus, the inverse channel apparatus is provided between an analog-to-digital converter and an adaptive equalization and polarization demultiplexer of the receiver, the inverse channel apparatus being configured to build an inverse channel of an original channel;

and when the receiver comprises a plurality of inverse channel apparatuses, the inverse channel apparatuses are provided between the analog-to-digital converter and the adaptive equalization and polarization demultiplexer of the receiver, each of the inverse channel apparatuses being configured to build inverse channels of a part of original channels.

According to still another aspect of the present invention, there is provided a transmitter, comprising one or a plurality of the above-described inverse channel apparatuses, wherein when the transmitter comprises one inverse channel apparatus, the inverse channel apparatus is provided before an digital-to-analog converter of the transmitter, the inverse channel apparatus being configured to build an inverse channel of an original channel;

and when the transmitter comprises a plurality of inverse channel apparatuses, the inverse channel apparatuses are provided before the digital-to-analog converter of the transmitter, each of the inverse channel apparatuses being configured to build inverse channels of a part of original channels.

According to further still another aspect of the present invention, there is provided a transmission system, comprising a transmitter and a receiver, the transmitter or receiver comprising one or a plurality of the inverse channel apparatuses.

The advantages of the embodiments of the present invention exist in that a transmitted signal is recovered by being passed through an inverse channel after or before being transmitted in a practical channel, thereby effectively compensating for intra-channel nonlinear damage of an optical fiber communication system.

Particular embodiments of the present invention will be described in detail below with reference to the following description and attached drawings and the schemes of using the principle of the present invention are pointed out. It should be understood that the implementation of the present invention is not limited thereto in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings.

DETAILED DESCRIPTION OF THE INVENTION

The foregoing and other features of the embodiments of the present invention will become apparent with reference to the attached drawings and the following description. These embodiments are illustrative only, and are not intended to limit the present invention. For the easy understanding of the principle and embodiments of the present invention, the embodiments of the present invention shall be described taking an optical fiber communication system as an example. However, it should be understood that the embodiments of the present invention are not limited thereto, and any other transmission systems needing elimination of intra-channel damages (including linear and nonlinear damages) may use the apparatus provided by the embodiments of the present invention.

Following description is given taking that an input signal contains two polarization states as an example. However, it should be understood that the embodiments of the present invention are not limited thereto. When an input signal contains only one polarization state, for example, H polarization state or V polarization state, linear damage and nonlinear damage may also be performed by the inverse channel apparatus of the embodiments of the present invention.

An inverse channel apparatus, a receiver comprising the inverse channel apparatus, a transmitter comprising the inverse channel apparatus and a transmission system comprising the inverse channel apparatus shall be described below with reference to the attached drawings.

Embodiment 1

Figure 1:
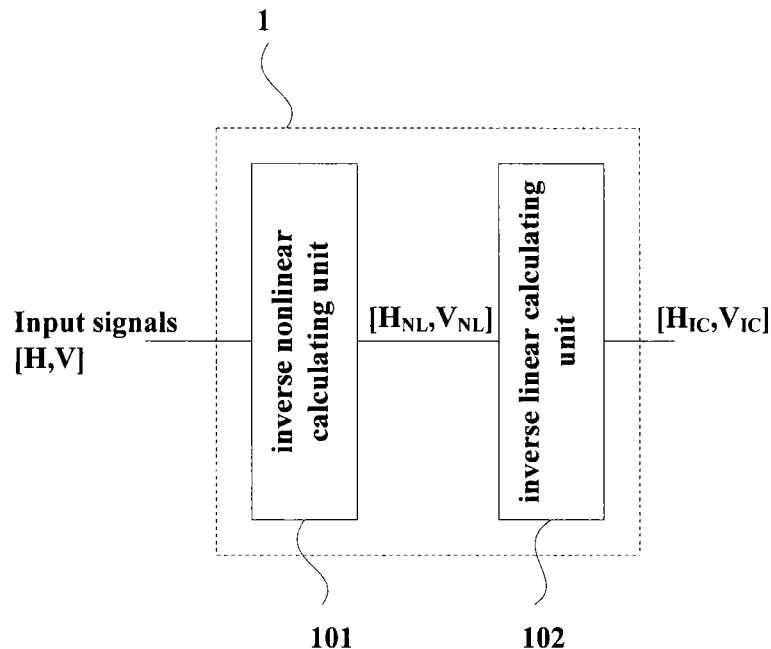
FIG. 1 is a schematic diagram of the composition of an inverse channel apparatus of an embodiment of the present invention.

An embodiment of the present invention provides an inverse channel apparatus. FIG. 1 is a schematic diagram of the composition of the inverse channel apparatus. Referring to FIG. 1, the inverse channel apparatus comprises: an inverse nonlinear calculating unit 101 and an inverse linear calculating unit 102, wherein the inverse nonlinear calculating unit 101 is configured to perform nonlinear additive calculation and nonlinear multiplicative calculation on input signals, so as to obtain signals containing nonlinear damage of the input signals on at least one polarization state; and the inverse linear calculating unit 102 is configured to calculate signals containing nonlinear damage and linear damage of the input signals on at least one polarization state according to the signals containing nonlinear damage of the input signals on at least one polarization state and a linear function of a channel.

In this embodiment, the input signals may comprise signals of two polarization states, and may also comprise signals of only one polarization state. When the input signals comprise signals of two polarization states, signals containing nonlinear damage of the input signals on the two polarization states may be obtained by the inverse nonlinear calculating unit 101. For example, when the input signals comprise a signal H on horizontal polarization state and a signal V on vertical polarization state, $H_{NL}$ and $V_{NL}$ may be obtained by using the inverse nonlinear calculating unit 101; where $H_{NL}$ is a signal containing nonlinear damage of the signal H on the horizontal polarization state, and $V_{NL}$ is a signal containing nonlinear damage of the signal V on the vertical polarization state. When the input signals comprise signals of only one polarization state, signals containing nonlinear damage of the input signals on the polarization state may be obtained by using the inverse nonlinear calculating unit 101. For example, when the input signals only comprise a signal H of horizontal polarization state, corresponding to that signal V of the input signals on vertical polarization state is 0, $H_{NL}$ is a signal containing nonlinear damage of the signal H on the horizontal polarization state may be obtained by using the inverse nonlinear calculating unit 101.

Figure 2A:
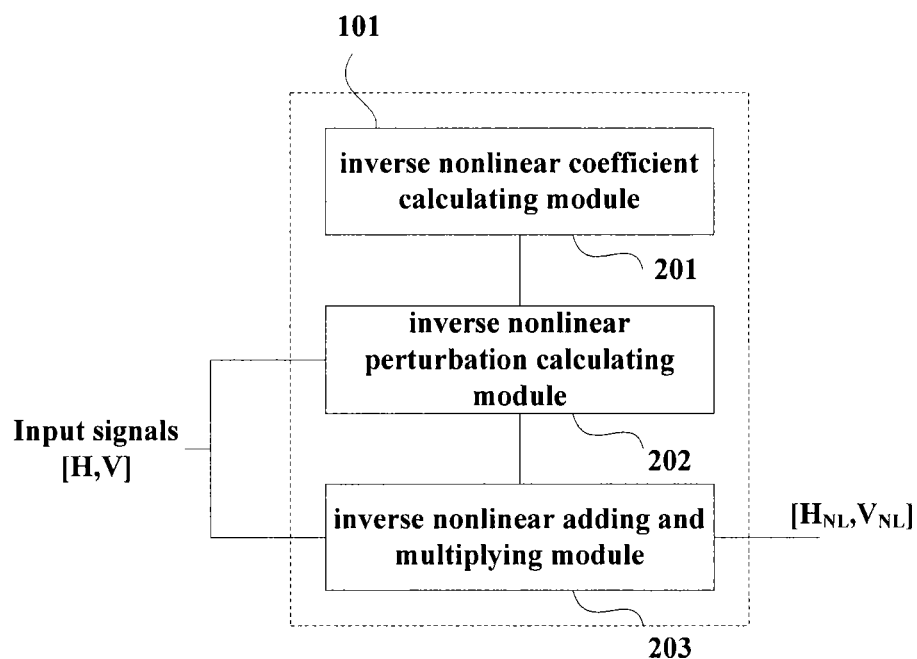
FIGS. 2A and 2B are schematic diagrams of the composition of two examples of an inverse nonlinear calculating unit of an embodiment of the present invention.

In an embodiment, as the channel configuration parameters of an original channel are known, the inverse nonlinear calculating unit 101 of this embodiment may be implemented by the composition as shown in FIG. 2A. Referring to FIG. 2A, the inverse nonlinear calculating unit 101 comprises: an inverse nonlinear coefficient calculating module 201, an inverse nonlinear perturbation calculating module 202 and an inverse nonlinear adding and multiplying module 203; wherein, the inverse nonlinear coefficient calculating module 201 is configured to calculate nonlinear coefficients of the inverse channel according to the channel configuration parameters;

the inverse nonlinear perturbation calculating module 202 is configured to calculate nonlinear perturbation within the inverse channel according to the nonlinear coefficients of the inverse channel and the input signals; and the inverse nonlinear adding and multiplying module 203 is configured to calculate signals containing nonlinear damage of the input signals on at least one polarization state according to the nonlinear perturbation within the inverse channel and the input signals.

In an embodiment, the inverse nonlinear coefficient calculating module 201 may calculate nonlinear coefficients of the inverse channel in an existing method of calculating nonlinear coefficient. However, as the existing method of calculating nonlinear coefficient is used to calculate nonlinear coefficients of an original channel, and nonlinear coefficients of an inverse channel are calculated in this embodiment, in calculating nonlinear coefficients of an inverse channel by using an existing method of calculating nonlinear coefficient, the symbols of the channel configuration parameters of the original channel need to be inverted, that is, nonlinear coefficients of an inverse channel are calculated by using an existing method of calculating nonlinear coefficient and taking the inverted values of the symbols of the channel configuration parameters of the original channel as the channel configuration parameters of the inverse channel.

In this embodiment, the channel configuration parameters comprise mainly optical fiber parameters, and the optical fiber parameters may be any combination of an attenuation factor ($\alpha$), a dispersion factor ($\beta$) and a nonlinear factor ($\gamma$). The selection of a particular combination depends on the method of calculating nonlinear coefficient. For example, if the three optical fiber parameters are used in the method of calculating nonlinear coefficient, the symbols of the three optical fiber parameters are inverted first, and then the nonlinear coefficients of the inverse channel are calculated by using the method of calculating nonlinear coefficient.

In this embodiment, as it is known that both Mecozzi's method (document of A. Meccozi et al., PTL, vol. 12, pp. 392-394, 2000) and Wei's method (document of X. Wei, Opt. Lett., vol. 31, pp. 2544-2546, 2006) may be used to calculate nonlinear coefficients of an original channel, the two method may be used to calculate the nonlinear coefficients of the inverse channel. Of course, in calculating the nonlinear coefficients of the inverse channel, the symbols of the used channel configuration parameters (such as optical fiber parameters) need to be inverted.

In an embodiment, the inverse nonlinear perturbation calculating module 202 may be used to calculate the nonlinear perturbation within the inverse channel caused by intra-channel four-wave mixing (IFWM), intra-channel cross phase modulation (IXPM) and self-phase modulation (SPM).

Wherein, the nonlinear perturbation caused by IFWM may be calculated by using the formula below:

$$\Delta_{h,IFWM,l} = j \sum_{m \neq 0} \sum_{n \neq 0} c(m,n)(H_{l+m}H_{l+n}H^*_{l+m+n} + H_{l+m}V_{l+n}V^*_{l+m+n});$$

$$\Delta_{h,IFWM,l} = j \sum_{m \neq 0} \sum_{n \neq 0} c(m,n)(H_{l+m}H_{l+n}H^*_{l+m+n} + H_{l+m}V_{l+n}V^*_{l+m+n}).$$

Wherein, the nonlinear perturbation caused by IXPM may be calculated by using the formula below:

$$\phi_{h,IXPM,l} = \sum_{m \neq 0} c(m,0)(2|H_{l+m}|^2 + |V_{l+m}|^2),$$

$$\phi_{v,IXPM,l} = \sum_{m \neq 0} c(m,0)(2|V_{l+m}|^2 + |H_{l+m}|^2),$$

$$w_{hv,IXPM,l} = j \sum_{m \neq 0} c(m,0)H_{l+m}V^*_{l+m},$$

$$w_{vh,IXPM,l} = j \sum_{m \neq 0} c(m,0)V_{l+m}H^*_{l+m}.$$

And wherein, the nonlinear perturbation caused by SPM may be calculated by using the formula below:

$$\phi_{h,SPM,l} = \phi_{v,SPM,l} = c(0,0)(|H_l|^2 + |V_l|^2).$$

In the above formulae, c is a nonlinear coefficient of the inverse channel, m and n are relative moments, l is an absolute moment, H is an input signal on the horizontal polarization state, and V is an input signal on the vertical polarization state. This embodiment is described taking calculation of nonlinear perturbation within the inverse channel by using the above formulae as an example. However, this embodiment is not limited thereto, and in the art and in the future developed technologies, all the methods of calculating nonlinear perturbation of an inverse channel are covered by the protection scope of the inverse nonlinear perturbation calculating module 202 of the embodiment of the present invention.

In an embodiment, the inverse nonlinear adding and multiplying module 203 may calculate the signals containing nonlinear damage of the input signals on at least one polarization state according to the following formula:

$$\begin{bmatrix} H_{NL} \\ V_{NL} \end{bmatrix} = \begin{bmatrix} e^{j(\phi_{h,IXPM}+\phi_{h,SPM})} & w_{hv,IXPM} \\ w_{vh,IXPM} & e^{j(\phi_{v,IXPM}+\phi_{v,SPM})} \end{bmatrix} \begin{bmatrix} H + \Delta_{h,IFWM} \\ V + \Delta_{v,IFWM} \end{bmatrix},$$

and may also calculate the signals containing nonlinear damage of the input signals on at least one polarization state according to the following formula:

$$\begin{bmatrix} H_{NL} \\ V_{NL} \end{bmatrix} = \begin{bmatrix} \sqrt{1-|w_{vh,IXPM}|^2}\, e^{j(\phi_{h,IXPM}+\phi_{h,SPM})} & w_{hv,IXPM} \\ w_{vh,IXPM} & \sqrt{1-|w_{hv,IXPM}|^2}\, e^{j(\phi_{v,IXPM}+\phi_{v,SPM})} \end{bmatrix} \begin{bmatrix} H + \Delta_{h,IFWM} \\ V + \Delta_{v,IFWM} \end{bmatrix},$$

and may also calculate the signals containing nonlinear damage of the input signals on at least one polarization state according to the following formula:

$$\begin{bmatrix} H_{NL} \\ V_{NL} \end{bmatrix} =$$

$$e^{j\phi_c}\begin{bmatrix} \sqrt{1-|w_{vh,IXPM}|^2}\, e^{j\phi_\Delta} & w_{hv,IXPM} \\ w_{vh,IXPM} & \sqrt{1-|w_{hv,IXPM}|^2}\, e^{-j\phi_\Delta} \end{bmatrix} \begin{bmatrix} H + \Delta_{h,IFWM} \\ V + \Delta_{v,IFWM} \end{bmatrix};$$

where, H is an input signal on the horizontal polarization state, V is an input signal on the vertical polarization state, $\Delta_{h,IFWM}$ and $\Delta_{v,IFWM}$ are the nonlinear perturbation caused by IFWM, $\phi_{h,IXPM}$, $\phi_{v,IXPM}$, $w_{hv,IXPM}$, and $w_{vh,IXPM}$ are the nonlinear perturbation caused by IXPM, and $\phi_{h,SPM}$ and $\phi_{v,SPM}$ are the nonlinear perturbation caused by SPM, $$\phi_c = \frac{\phi_{h,IXPM} + \phi_{v,IXPM}}{2} + \phi_{h,SPM}, \quad \phi_\Delta = \frac{\phi_{h,IXPM} - \phi_{v,IXPM}}{2},$$

and all the nonlinear perturbation is obtained by the above-described inverse nonlinear perturbation calculating module 202.

In this embodiment, the above formulae may also be referred to as additive-multiplicative models. These formulae are illustrative only, and any other calculation method and formulae eliminating nonlinear damage by performing additive and multiplicative calculation on input signals and nonlinear perturbation are all covered by the protection scope of the inverse nonlinear adding and multiplying module 203 of the embodiment of the present invention.

Figure 2B:
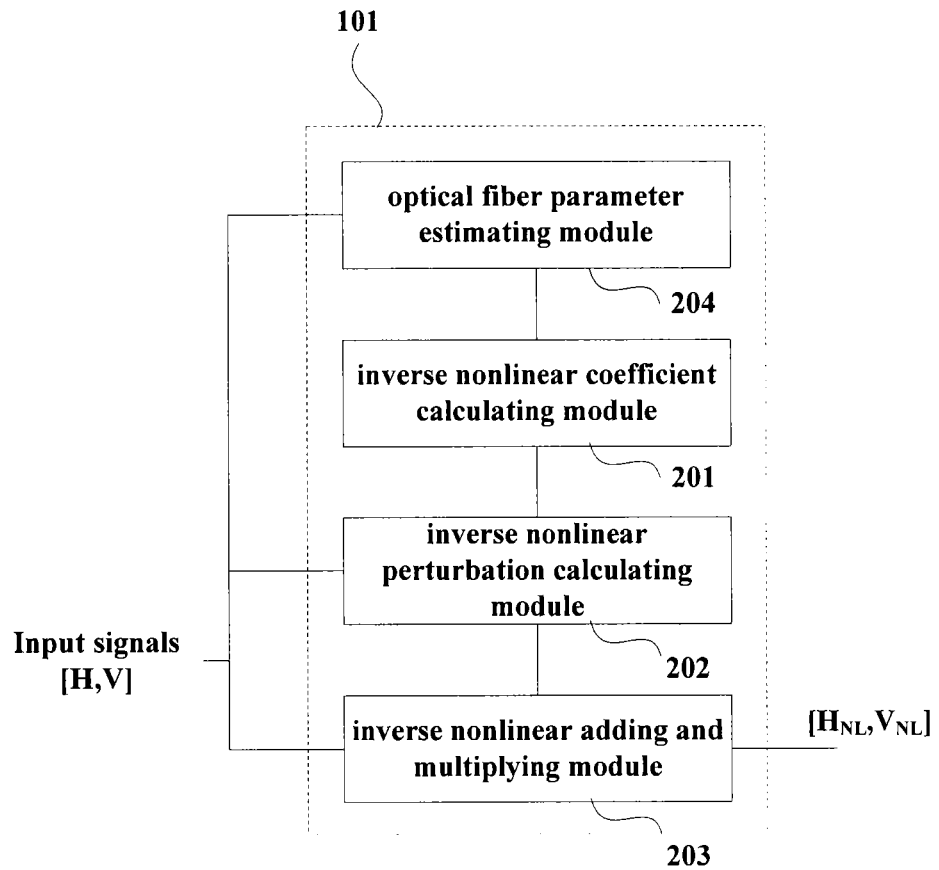

In another embodiment, as the channel configuration parameters of an original channel are unknown, the composition of the inverse nonlinear calculating unit 101 of this embodiment may be implemented as shown in FIG. 2B. Referring to FIG. 2B, besides the inverse nonlinear coefficient calculating module 201, the inverse nonlinear perturbation calculating module 202 and the inverse nonlinear adding and multiplying module 203, the inverse nonlinear calculating unit 101 further comprises an optical fiber parameter estimating module 204.

In this embodiment, the optical fiber parameter estimating module 204 estimates parameters (including an attenuation factor α and/or a dispersion factor β and/or a nonlinear factor γ) of an optical fiber channel by analyzing input signals, such as H and V, so as to provide to the nonlinear coefficient calculating module. The method for estimating optical fiber parameters can also be implemented by known technology, such as the methods described in the documents of L. Liu et al., OFC2009, paper JWA36 and J. C. Geyer et al., PTL, vol. 20, pp. 776-778, 2008, etc.

The above two schemes of implementation are just two examples of the inverse nonlinear calculating unit 101. However, this embodiment is not limited thereto, and other composition capable of implementing the functions of the inverse nonlinear calculating unit 101 is also covered by the protection scope of the present invention.

Figure 3A:
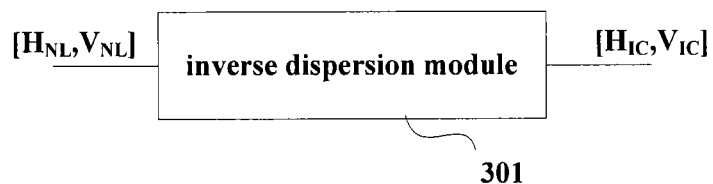
FIGS. 3A and 3B are schematic diagrams of the composition of two examples of an inverse linear calculating unit of an embodiment of the present invention.

In an embodiment, the inverse linear calculating unit 102 may be implemented by an inverse dispersion module 301 shown in FIG. 3A. As shown in FIG. 3A, the inverse dispersion module 301 calculates signals containing nonlinear damage and linear damage of the input signals on at least one polarization state according to the signals containing nonlinear damage of the input signals on at least one polarization state and a dispersion transfer function of the channel.

In this embodiment, the inverse dispersion module 301 calculates signals containing nonlinear damage and linear damage of the input signals on at least one polarization state according to the following formula:

$$H_{IC} = H_{NL} \otimes h_{CD}^{-1};$$

$$V_{IC} = V_{NL} \otimes h_{CD}^{-1};$$

where, $H_{IC}$ is a signal containing nonlinear damage and linear damage of the input signals on the horizontal polarization state, and $V_{IC}$ is a signal containing nonlinear damage and linear damage of the input signals on the vertical polarization state; likewise, when the input signals have only one polarization state, a signal containing nonlinear damage and linear damage of the input signals on this polarization state may only be obtained by the inverse dispersion module 301; that is, only $H_{IC}$ or $V_{IC}$ is obtained;

where, $H_{NL}$ is a signal containing nonlinear damage of the input signals on the horizontal polarization state, and $V_{NL}$ is a signal containing nonlinear damage of the input signals on the vertical polarization state; and $H_{NL}$ and $V_{NL}$ are obtained through calculation by the above-described inverse nonlinear adding and multiplying module 203 of the inverse nonlinear calculating unit 101; likewise, when the input signals have only on polarization state, a signal containing nonlinear damage of the input signals on this polarization state may only be obtained by the inverse nonlinear adding and multiplying module 203; that is, only $H_{NL}$ or $V_{NL}$ is obtained;

and where, $h_{CD}$ is a dispersion transfer function of the original channel, and $h_{CD}^{-}$, is inversion of the dispersion transfer function of the original channel.

Figure 3B:
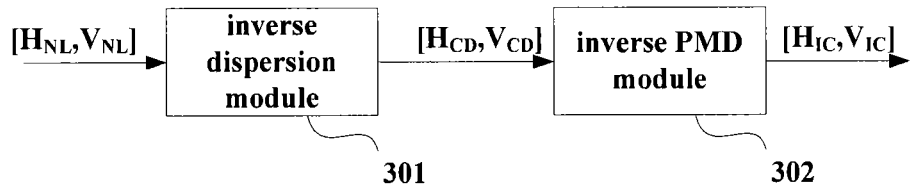

In another embodiment, the inverse linear calculating unit 102 may be implemented by the composition as shown in FIG. 3B. Referring to FIG. 3B, besides the inverse dispersion module 301, the inverse linear calculating unit 102 further comprises an inverse polarization mode dispersion (PMD) module 302.

In this embodiment, the relationship between the input signals and output signals of the inverse PMD module 302 is:

$$\begin{bmatrix} H_{IC} \\ V_{IC} \end{bmatrix} = H_{PMD}^{-1} \times \begin{bmatrix} H_{CD} \\ V_{CD} \end{bmatrix};$$

where, $H_{PMD}$ is a PMD transmission matrix of the original channel, and $H_{PMD}^{-1}$ is inversion of the PMD transmission matrix of the original channel.

The above two schemes of implementation are just two examples of the inverse linear calculating unit 102. However, this embodiment is not limited thereto, and other composition capable of implementing the functions of the inverse linear calculating unit 102 is also covered by the protection scope of the present invention.

In this embodiment, the inverse channel apparatus is applicable to but not limited to such modulation formats as mPSK, mQAM and mAPSK, and subcarrier multiplexing or OFDM technology.

Figure 4:
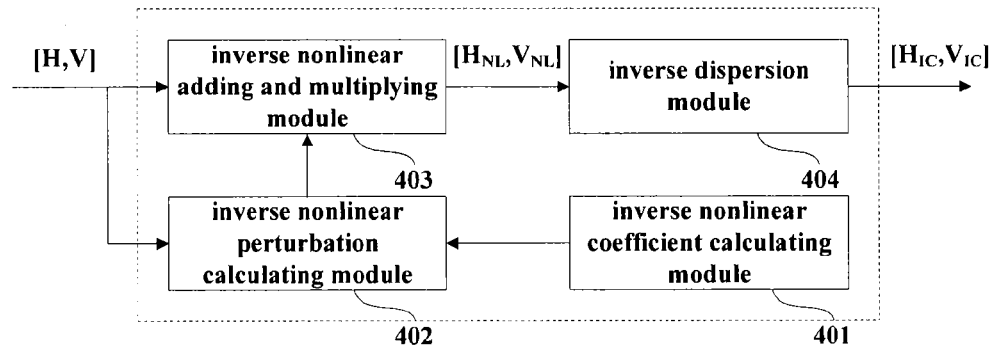
FIG. 4 is a schematic diagram of the composition of an inverse channel apparatus of a preferred embodiment of the present invention.

FIG. 4 is a schematic diagram of the composition of an inverse channel apparatus of a preferred embodiment of the present invention. Referring to FIG. 4, the inverse channel apparatus comprises: an inverse nonlinear coefficient calculating module 401, an inverse nonlinear perturbation calculating module 402, an inverse nonlinear adding and multiplying module 403 and an inverse dispersion module 404.

Wherein, the inverse nonlinear coefficient calculating module 401 may be implemented by the above-described inverse nonlinear coefficient calculating module 201, the inverse nonlinear perturbation calculating module 402 may be implemented by the above-described inverse nonlinear perturbation calculating module 202, the inverse nonlinear adding and multiplying module 403 may be implemented by the above-described inverse nonlinear adding and multiplying module 203, and the inverse dispersion module 404 may be implemented by the above-described inverse dispersion module 301. As the inverse nonlinear coefficient calculating module 201, the inverse nonlinear perturbation calculating module 202, the inverse nonlinear adding and multiplying module 203 and the inverse dispersion module 301 have been described above, they shall not be described any further.

With the inverse channel apparatus of the embodiment of the present invention, a transmitted signal is recovered in a receiver by being passed through the inverse channel apparatus of the embodiment of the present invention after or before being transmitted in a practical channel, and intra-channel damages (including linear and nonlinear damages) are eliminated, thereby effectively compensating for intra-channel nonlinear damage of an optical fiber communication system.

Embodiment 2

An embodiment of the present invention further provides a receiver, comprising the inverse channel apparatus of the Embodiment 1 of the present invention, in addition to original composition and functions.

In an embodiment, the receiver comprises one inverse channel apparatus of the Embodiment 1 of the present invention, and the inverse channel apparatus is provided between an analog-to-digital converter and an adaptive equalization and polarization demultiplexer of the receiver. In this embodiment, the inverse channel apparatus is configured to build an inverse channel of whole of an original channel; that is, the inverse channel apparatus is configured to calculate each value by using parameters corresponding to the whole original channel.

Figure 5:
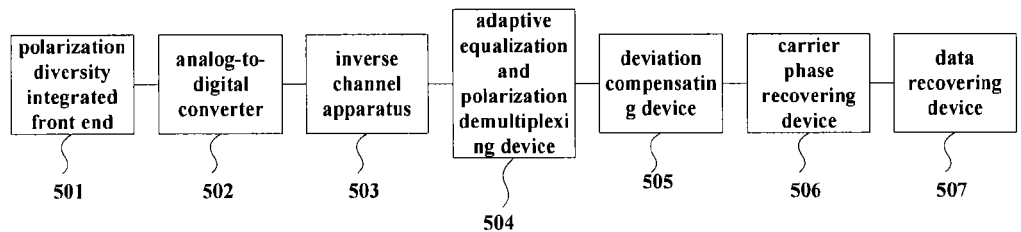
FIG. 5 is a schematic diagram of the composition of a receiver comprising one inverse channel apparatus of an embodiment of the present invention.

FIG. 5 is a schematic diagram of the composition of the receiver. Referring to FIG. 5, the receiver comprises:

a polarization diversity integrated front end 501, an analog-to-digital converter 502, an inverse channel apparatus 503, an adaptive equalization and polarization demultiplexing device 504, a deviation compensating device 505, a carrier phase recovering device 506 and a data recovering device 507.

Wherein, the polarization diversity integrated front end 501, the analog-to-digital converter 502, the adaptive equalization and polarization demultiplexing device 504, the deviation compensating device 505, the carrier phase recovering device 506 and the data recovering device 507 may be implemented in an existing scheme, and the contents of which are incorporated herein, and shall not be described any further.

And wherein the inverse channel apparatus 503 may be implemented by the inverse channel apparatus 1 of Embodiment 1, and the description of it is omitted herein.

Figure 6:
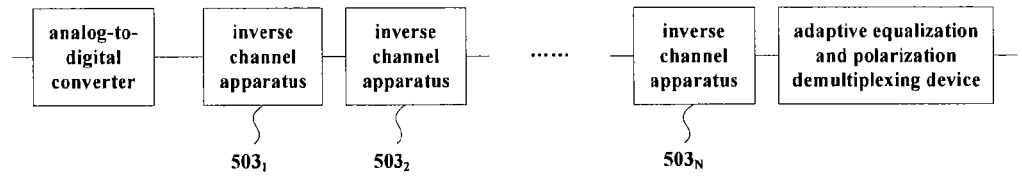
FIG. 6 is a schematic diagram of the composition of a receiver comprising a plurality of inverse channel apparatuses of an embodiment of the present invention.

In another embodiment, the receiver comprises a plurality of inverse channel apparatuses provided by the Embodiment 1 of the present invention, and the inverse channel apparatuses are also provided between the analog-to-digital converter and the adaptive equalization and polarization demultiplexer of the receiver. In this embodiment, each of the inverse channel apparatuses ($503_1$-$503_N$) is configured to build an inverse channel of a part of an original channel; that is, each of the inverse channel apparatuses is configured to calculate each value by using parameters corresponding to part of the original channel. In this embodiment, it corresponds to that the inverse channel apparatus 503 of FIG. 5 is disassembled into N cascaded units; that is, an inverse channel of only a part of the original channel is constructed each time, and then the inverse channel of the whole original channel is constructed in a cascaded scheme, as shown in FIG. 6. In this embodiment, as the whole inverse channel is disassembled, the nonlinear effect contained in each unit of the inverse channel is weakened, thereby improving the accuracy of the perturbation analysis. An extreme example is to take each span of an optical fiber as a cascade for constructing an inverse channel, without using an additive-multiplicative model and taking phase noise of the SPM into consideration only, and the structure of FIG. 6 is degraded into a known BP technology (document of E. Ip et al., JLT, vol. 26, pp. 3416-3425, 2008).

The receiver of the embodiment of the present invention uses the inverse channel apparatus, in which a transmitted signal is recovered in the receiver by being passed through the inverse channel apparatus after being transmitted in a practical channel, and intra-channel damages (including linear and nonlinear damages) are eliminated, thereby effectively compensating for intra-channel nonlinear damage of an optical fiber communication system.

Embodiment 3

An embodiment of the present invention further provides a transmitter, comprising the inverse channel apparatus of the Embodiment 1 of the present invention, in addition to original composition and functions.

In an embodiment, the transmitter comprises one inverse channel apparatus of the Embodiment 1 of the present invention, and the inverse channel apparatus is provided before an digital-to-analog converter of the transmitter. In this embodiment, the inverse channel apparatus is configured to build an inverse channel of whole of an original channel; that is, the inverse channel apparatus is configured to calculate each value by using parameters corresponding to the whole original channel.

Figure 7:
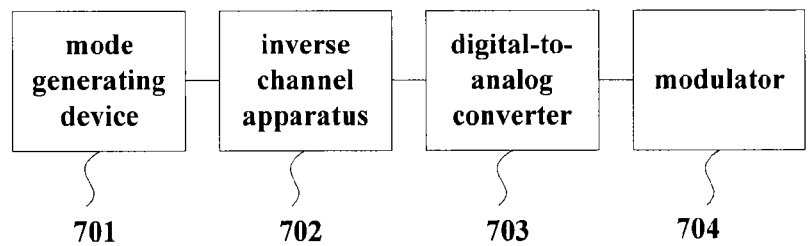
FIG. 7 is a schematic diagram of the composition of a transmitter comprising one inverse channel apparatus of an embodiment of the present invention.

FIG. 7 is a schematic diagram of the composition of the transmitter. Referring to FIG. 7, the transmitter comprises:

a mode generating device 701, an inverse channel apparatus 702, an digital-to-analog converter 703 and a modulator 704.

Wherein, the mode generating device 701, the digital-to-analog converter 703 and the modulator 704 may be implemented in an existing scheme, and the contents of which are incorporated herein, and shall not be described any further.

And wherein the inverse channel apparatus 702 may be implemented by the inverse channel apparatus 1 of Embodiment 1, and the description of it is omitted herein.

Figure 8:
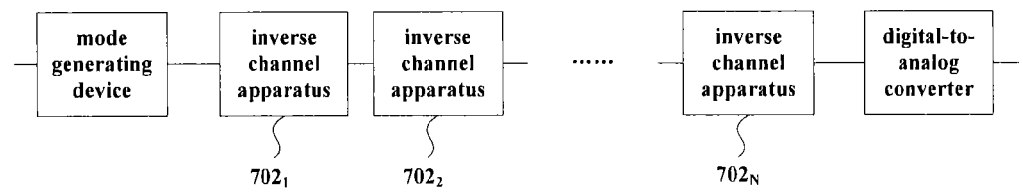
FIG. 8 is a schematic diagram of the composition of a transmitter comprising a plurality of inverse channel apparatuses of an embodiment of the present invention.

In another embodiment, the transmitter comprises a plurality of inverse channel apparatuses provided by the Embodiment 1 of the present invention, and the inverse channel apparatuses are also provided before the digital-to-analog converter of the transmitter. In this embodiment, each of the inverse channel apparatuses ($702_1$-$702_N$) is configured to build an inverse channel of a part of an original channel; that is, each of the inverse channel apparatuses is configured to calculate each value by using parameters corresponding to part of the original channel. In this embodiment, it corresponds to that the inverse channel apparatus 702 of FIG. 7 is disassembled into N cascaded units; that is, an inverse channel of only a part of the original channel is constructed each time, and then the inverse channel of the whole original channel is constructed in a cascaded scheme, as shown in FIG. 8. In this embodiment, as the whole inverse channel is disassembled, the nonlinear effect contained in each unit of the inverse channel is weakened, thereby improving the accuracy of the perturbation analysis. An extreme example is to take each span of an optical fiber as a cascade for constructing an inverse channel, without using an additive-multiplicative model and taking phase noise of the SPM into consideration only, and the structure of FIG. 8 is degraded into a known BP technology (document of E. Ip et al., JLT, vol. 26, pp. 3416-3425, 2008).

The transmitter of the embodiment of the present invention uses the inverse channel apparatus, in which a transmitted signal is recovered in the receiver by being passed through the inverse channel apparatus after being transmitted in a practical channel, and intra-channel damages (including linear and nonlinear damages) are eliminated, thereby effectively compensating for intra-channel nonlinear damage of an optical fiber communication system.

Embodiment 4

Figure 9:
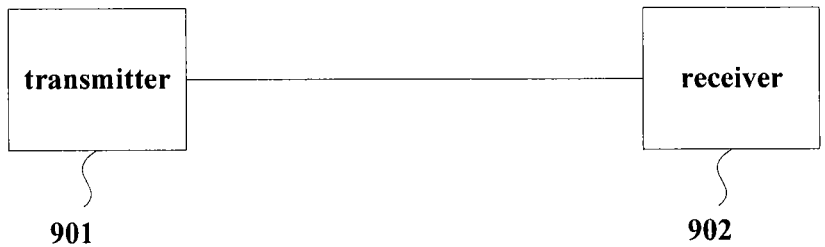
FIG. 9 is a schematic diagram of the composition of a transmission system of an embodiment of the present invention.

An embodiment of the present invention further provides a transmission system. FIG. 9 is a schematic diagram of the composition of the transmission system. Referring to FIG. 9, the transmission system comprises a transmitter 901 and a receiver 902, wherein the transmitter 901 or the receiver 902 comprises one or more inverse channel apparatuses of Embodiment 1.

In an embodiment, the transmitter 901 comprises one or a plurality of inverse channel apparatuses of Embodiment 1. When one inverse channel apparatus is included, the inverse channel apparatus builds an inverse channel of a whole original channel. And when a plurality of inverse channel apparatuses are included, each of the inverse channel apparatuses builds an inverse channel of a part of the whole original channel, and all the inverse channel apparatuses build an inverse channel of the whole original channel.

In another embodiment, the receiver 902 comprises one or a plurality of inverse channel apparatuses of Embodiment 1. When one inverse channel apparatus is included, the inverse channel apparatus builds an inverse channel of a whole original channel. And when a plurality of inverse channel apparatuses are included, each of the inverse channel apparatuses builds an inverse channel of a part of the whole original channel, and all the inverse channel apparatuses build an inverse channel of the whole original channel.

In another embodiment, both the transmitter 901 and the receiver 902 comprise one or a plurality of inverse channel apparatuses of Embodiment 1. Each of the inverse channel apparatuses builds an inverse channel of a part of the whole original channel, and all the inverse channel apparatuses build an inverse channel of the whole original channel. For example, the transmitter and the receiver respectively builds an inverse channel of a half of an optical fiber transmission channel by one or a plurality of inverse channel apparatuses of Embodiment 1, which can also achieve an effect of compensating for a whole optical fiber transmission channel.

In this embodiment, the transmission system may be an optical fiber communication transmission system, and may also be other transmission systems needing nonlinear compensation, and this embodiment is not limited thereto.

The transmission system of the embodiment of the present invention uses the inverse channel apparatus, in which a transmitted signal is recovered in the receiver by being passed through the inverse channel apparatus before and/or after being transmitted in a practical channel, and intra-channel damages (including linear and nonlinear damages) are eliminated, thereby effectively compensating for intra-channel nonlinear damage of an optical fiber communication system.

Figure 10:
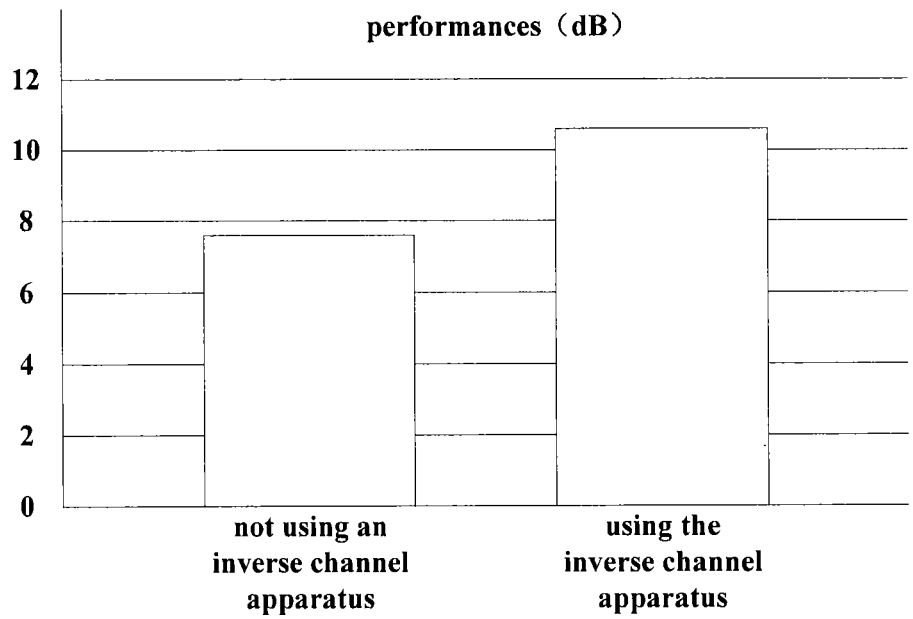
FIG. 10 is a schematic diagram of experimental performances of nonlinear compensation by using an inverse channel apparatus of an embodiment of the present invention.

FIG. 10 is a schematic diagram of comparison of performances of not using an inverse channel apparatus and using the inverse channel apparatus of the embodiment of the present invention in a typical long-haul coherent optical transmission experiment. It can be seen from FIG. 10 that the inverse channel apparatus of the embodiment of the present invention can effectively improve the performances of nonlinear compensation.

Embodiment 5

Figure 11:
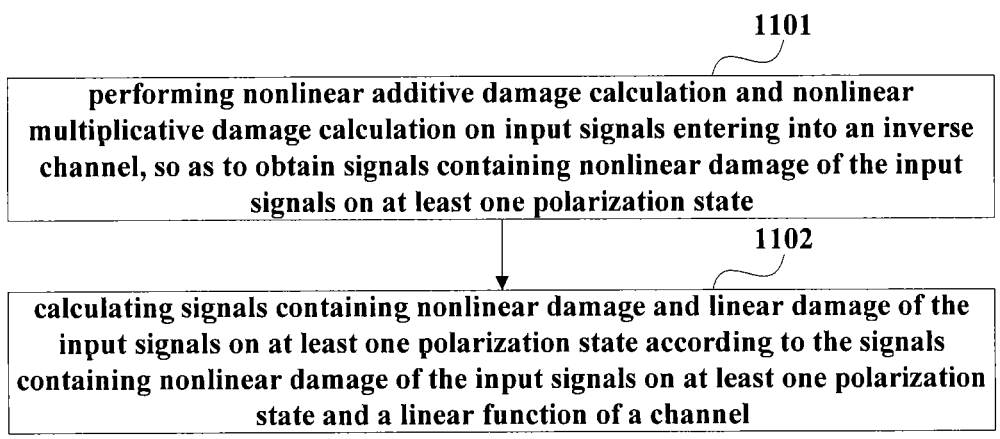
FIG. 11 is a flowchart of a nonlinear compensation method of an embodiment of the present invention.

An embodiment of the present invention further provides a nonlinear compensation method. FIG. 11 is a flowchart of the method. Referring to FIG. 11, the method comprises:

step 1101: performing nonlinear additive damage calculation and nonlinear multiplicative damage calculation on input signals entering into an inverse channel, so as to obtain signals containing nonlinear damage of the input signals on at least one polarization state; and step 1102: calculating signals containing nonlinear damage and linear damage of the input signals on at least one polarization state according to the signals containing nonlinear damage of the input signals on at least one polarization state and a linear function of a channel.

In an embodiment, an inverse channel may be built by perturbation analysis of nonlinear effect, the nonlinear effect in the inverse channel may be indicated by a additive-multiplicative model (AM model), and then intra-channel nonlinear damage is calculated by using a perturbation method according to nonlinear coefficients. Mecozzi's method (document of A. Meccozi et al., PTL, vol. 12, pp. 392-394, 2000) or Wei's method (document of X. Wei, Opt. Lett., vol. 31, pp. 2544-2546, 2006) may be used for the calculation of the nonlinear coefficients. Wherein, a typical example of the AM model is as described in document "A calculation apparatus for intra-channel nonlinearly introduced noise", the inventor of which is Liang Dou, with the application No. 201110287852.X.

In this embodiment, in step 1101, the nonlinear coefficients of the inverse channel may be calculated first according to the channel configuration parameters of the inverse channel, then the nonlinear perturbation within the inverse channel is calculated according to the nonlinear coefficients of the inverse channel and the input signals, and finally signals containing nonlinear damage of the input signals on at least one polarization state are calculated according the nonlinear perturbation within the inverse channel and the input signals.

In an embodiment, the channel configuration parameters of the inverse channel comprise optical fiber parameters, the optical fiber parameters comprising an attenuation factor $\alpha$ and/or a dispersion factor $\beta$ and/or a nonlinear factor $\gamma$; wherein the nonlinear coefficients of the inverse channel may be calculated according to inverted values of the optical fiber parameters.

In an embodiment, the nonlinear perturbation within the inverse channel comprises nonlinear perturbation caused by intra-channel four-wave mixing (IFWM), intra-channel cross phase modulation (IXPM) and self-phase modulation (SPM);

and wherein, the nonlinear perturbation caused by IFWM is:

$$\Delta_{h,IFWM,l} = j\sum_{m\neq 0}\sum_{n\neq 0} c(m,n)(H_{l+m}H_{l+n}H^*_{l+m+n} + H_{l+m}V_{l+n}V^*_{l+m+n}),$$

$$\Delta_{h,IFWM,l} = j\sum_{m\neq 0}\sum_{n\neq 0} c(m,n)(H_{l+m}H_{l+n}H^*_{l+m+n} + H_{l+m}V_{l+n}V^*_{l+m+n});$$

the nonlinear perturbation caused by IXPM is:

$$\phi_{h,IXPM,l} = \sum_{m\neq 0} c(m,0)(2|H_{l+m}|^2 + |V_{l+m}|^2),$$

$$\phi_{v,IXPM,l} = \sum_{m\neq 0} c(m,0)(2|V_{l+m}|^2 + |H_{l+m}|^2),$$

$$w_{hv,IXPM,l} = j\sum_{m\neq 0} c(m,0)H_{l+m}V^*_{l+m},$$

$$w_{vh,IXPM,l} = j\sum_{m\neq 0} c(m,0)V_{l+m}H^*_{l+m};$$

and the nonlinear perturbation caused by SPM is:

$$\phi_{h,SPM,l} = \phi_{v,SPM,l} = c(0,0)(|H_l|^2 + |V_l|^2);$$

where, c is a nonlinear coefficient of the inverse channel, m and n are relative moments, l is an absolute moment, H is an input signal on the horizontal polarization state, and V is an input signal on the vertical polarization state.

In an embodiment, the signals containing nonlinear damage of the input signals on at least one polarization state are calculated according to the following formula:

$$\begin{bmatrix} H_{NL} \\ V_{NL} \end{bmatrix} = \begin{bmatrix} e^{j(\phi_{h,IXPM}+\phi_{h,SPM})} & w_{hv,IXPM} \\ w_{vh,IXPM} & e^{j(\phi_{v,IXPM}+\phi_{v,SPM})} \end{bmatrix} \begin{bmatrix} H + \Delta_{h,IFWM} \\ V + \Delta_{v,IFWM} \end{bmatrix},$$

or $$\begin{bmatrix} H_{NL} \\ V_{NL} \end{bmatrix} = \begin{bmatrix} \sqrt{1-|w_{vh,IXPM}|^2}\, e^{j(\phi_{h,IXPM}+\phi_{h,SPM})} & w_{hv,IXPM} \\ w_{vh,IXPM} & \sqrt{1-|w_{hv,IXPM}|^2}\, e^{j(\phi_{v,IXPM}+\phi_{v,SPM})} \end{bmatrix} \begin{bmatrix} H + \Delta_{h,IFWM} \\ V + \Delta_{v,IFWM} \end{bmatrix},$$

or $$\begin{bmatrix} H_{NL} \\ V_{NL} \end{bmatrix} = e^{j\phi_c} \begin{bmatrix} \sqrt{1-|w_{vh,IXPM}|^2}\, e^{j\phi_\Delta} & w_{hv,IXPM} \\ w_{vh,IXPM} & \sqrt{1-|w_{hv,IXPM}|^2}\, e^{-j\phi_\Delta} \end{bmatrix} \begin{bmatrix} H + \Delta_{h,IFWM} \\ V + \Delta_{v,IFWM} \end{bmatrix};$$

where, $\Delta_{h,IFWM}$ and $\Delta_{v,IFWM}$ are the nonlinear perturbation caused by IFWM, $\phi_{h,IXPM}$, $\phi_{v,IXPM}$, $w_{hv,IXPM}$ and $w_{vh,IXPM}$ are the nonlinear perturbation caused by IXPM, $\phi_{h,SPM}$ and $\phi_{v,SPM}$ are the nonlinear perturbation caused by SPM, $$\phi_c = \frac{\phi_{h,IXPM} + \phi_{v,IXPM}}{2} + \phi_{h,SPM},\ \phi_\Delta = \frac{\phi_{h,IXPM} - \phi_{v,IXPM}}{2},$$

H is an input signal on the horizontal polarization state, and V is an input signal on the vertical polarization state.

In an embodiment, the signals containing nonlinear damage and linear damage of the input signals on at least one polarization state are obtained by calculating according to the signals containing nonlinear damage of the input signals on at least one polarization state and a dispersion transfer function of the channel;

and wherein the signals containing nonlinear damage and linear damage of the input signals on at least one polarization state are calculated according to the following formula:

$$H_{IC} = H_{NL} \otimes h_{CD}^{-1};$$

$$V_{IC} = V_{NL} \otimes h_{CD}^{-1}.$$

The above formulae and calculation methods are illustrative only, and the embodiments of the present invention are not limited to particular manners of implementation. All the methods carrying out the above-described functions according to the above description are covered by the protection scope of the embodiments of the present invention.

The method of the embodiment of the present invention may be applicable to compensation for nonlinear damage of a whole optical fiber transmission channel (original channel), and also to compensation for nonlinear damage of part of an optical fiber transmission channel (original channel). However, this embodiment is not limited thereto. A particular difference mainly exists in the used channel configuration parameters, such as a length of an optical fiber in optical fiber parameters, etc.

In the method of the embodiment of the present invention, by building inversion of a channel (i.e. an inverse channel), a transmitted signal is recovered in a receiver by being passed through the inverse channel after or before being transmitted in a practical channel, and intra-channel damages, including linear and nonlinear damages, are eliminated.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium.

More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

For the implementation of the present invention containing the above embodiments, following supplements are further disclosed.

Supplement 1. An inverse channel apparatus, comprising:
an inverse nonlinear calculating unit configured to perform nonlinear additive calculation and nonlinear multiplicative calculation on input signals, so as to obtain signals containing nonlinear damage of the input signals on at least one polarization state; and an inverse linear calculating unit configured to calculate signals containing nonlinear damage and linear damage of the input signals on at least one polarization state according to the signals containing nonlinear damage of the input signals on at least one polarization state and a linear function of a channel.

Supplement 2. The apparatus according to supplement 1, wherein the inverse nonlinear calculating unit comprises:
an inverse nonlinear coefficient calculating module configured to calculate nonlinear coefficients of the inverse channel according to channel configuration parameters;
an inverse nonlinear perturbation calculating module configured to calculate nonlinear perturbation within the inverse channel according to the nonlinear coefficients of the inverse channel and the input signals; and
an inverse nonlinear adding and multiplying module configured to calculate signals containing nonlinear damage of the input signals on at least one polarization state according to the nonlinear perturbation within the inverse channel and the input signals.

Supplement 3. The apparatus according to supplement 2, wherein the channel configuration parameters comprise optical fiber parameters, the optical fiber parameters comprising an attenuation factor α and/or a dispersion factor β and/or a nonlinear factor γ;
and wherein the inverse nonlinear coefficient calculating module calculates the nonlinear coefficients of the inverse channel according to inverted values of the optical fiber parameters.

Supplement 4. The apparatus according to supplement 2, wherein the inverse nonlinear perturbation calculating module is configured to calculate nonlinear perturbation within the inverse channel caused by intra-channel four-wave mixing (IFWM), intra-channel cross phase modulation (IXPM) and self-phase modulation (SPM);
and wherein,
the nonlinear perturbation caused by IFWM is:

$$\Delta_{h,IFWM,l} = j\sum_{m\neq 0}\sum_{n\neq 0} c(m,n)(H_{l+m}H_{l+n}H^*_{l+m+n} + H_{l+m}V_{l+n}V^*_{l+m+n}),$$

$$\Delta_{h,IFWM,l} = j\sum_{m\neq 0}\sum_{n\neq 0} c(m,n)(H_{l+m}H_{l+n}H^*_{l+m+n} + H_{l+m}V_{l+n}V^*_{l+m+n});$$

the nonlinear perturbation caused by IXPM is:

$$\phi_{h,IXPM,l} = \sum_{m\neq 0} c(m,0)(2|H_{l+m}|^2 + |V_{l+m}|^2),$$

$$\phi_{v,IXPM,l} = \sum_{m\neq 0} c(m,0)(2|V_{l+m}|^2 + |H_{l+m}|^2),$$

$$w_{hv,IXPM,l} = j\sum_{m\neq 0} c(m,0)H_{l+m}V^*_{l+m},$$

$$w_{vh,IXPM,l} = j\sum_{m\neq 0} c(m,0)V_{l+m}H^*_{l+m};$$

and the nonlinear perturbation caused by SPM is:

$$\phi_{h,SPM,l} = \phi_{v,SPM,l} = C(0,0)(|H_l|^2 + |V_l|^2);$$

where, c is a nonlinear coefficient of the inverse channel, m and n are relative moments, l is an absolute moment, H is an input signal on the horizontal polarization state, and V is an input signal on the vertical polarization state.

Supplement 5. The apparatus according to Supplement 2, wherein the inverse nonlinear adding and multiplying module calculates the signals containing nonlinear damage of the input signals on at least one polarization state according to the following formula:

$$\begin{bmatrix} H_{NL} \\ V_{NL} \end{bmatrix} = \begin{bmatrix} e^{j(\phi_{h,IXPM}+\phi_{h,SPM})} & w_{hv,IXPM} \\ w_{vh,IXPM} & e^{j(\phi_{v,IXPM}+\phi_{v,SPM})} \end{bmatrix} \begin{bmatrix} H+\Delta_{h,IFWM} \\ V+\Delta_{v,IFWM} \end{bmatrix},$$

or $$\begin{bmatrix} H_{NL} \\ V_{NL} \end{bmatrix} = \begin{bmatrix} \sqrt{1-|w_{vh,IXPM}|^2}\, e^{j(\phi_{h,IXPM}+\phi_{h,SPM})} & w_{hv,IXPM} \\ w_{vh,IXPM} & \sqrt{1-|w_{hv,IXPM}|^2}\, e^{j(\phi_{v,IXPM}+\phi_{v,SPM})} \end{bmatrix} \begin{bmatrix} H+\Delta_{h,IFWM} \\ V+\Delta_{v,IFWM} \end{bmatrix},$$

or $$\begin{bmatrix} H_{NL} \\ V_{NL} \end{bmatrix} = e^{j\phi_c} \begin{bmatrix} \sqrt{1-|w_{vh,IXPM}|^2}\, e^{j\phi_\Delta} & w_{hv,IXPM} \\ w_{vh,IXPM} & \sqrt{1-|w_{hv,IXPM}|^2}\, e^{-j\phi_\Delta} \end{bmatrix} \begin{bmatrix} H+\Delta_{h,IFWM} \\ V+\Delta_{v,IFWM} \end{bmatrix};$$

where, $\Delta_{h,IFWM}$ and $\Delta_{v,IFWM}$ are the nonlinear perturbation caused by IFWM, $\phi_{h,IXPM}$, $\phi_{v,IXPM}$, $w_{hv,IXPM}$ and $w_{vh,IXPM}$ are the nonlinear perturbation caused by IXPM, $\phi_{h,SPM}$ and $\phi_{v,SPM}$ are the nonlinear perturbation caused by SPM, $$\phi_c = \frac{\phi_{h,IXPM}+\phi_{v,IXPM}}{2} + \phi_{h,SPM},\; \phi_\Delta = \frac{\phi_{h,IXPM}-\phi_{v,IXPM}}{2},$$

H is an input signal on the horizontal polarization state, and V is an input signal on the vertical polarization state.

Supplement 6. The apparatus according to supplement 1, wherein the inverse linear calculating unit is an inverse dispersion unit which calculates signals containing nonlinear damage and linear damage of the input signals on at least one polarization state according to the signals containing nonlinear damage of the input signals on at least one polarization state and a dispersion transfer function of the channel;

and wherein the inverse dispersion unit calculates signals containing nonlinear damage and linear damage of the input signals on at least one polarization state according to the following formula:

$$H_{IC} = H_{NL} \otimes h_{CD}^{-1};$$

$$V_{IC} = V_{NL} \otimes h_{CD}^{-1}.$$

Supplement 7. A receiver, comprising one or a plurality of inverse channel apparatuses as described in any one of supplements 1-6, wherein when the receiver comprises one inverse channel apparatuses, the inverse channel apparatus is provided between an analog-to-digital converter and an adaptive equalization and polarization demultiplexer of the receiver, the inverse channel apparatus being configured to build an inverse channel of an original channel;

and when the receiver comprises a plurality of inverse channel apparatuses, the inverse channel apparatuses are provided between the analog-to-digital converter and the adaptive equalization and polarization multiplexer of the receiver, each of the inverse channel apparatuses being configured to build inverse channels of a part of original channels.

Supplement 8. A transmitter, comprising one or a plurality of inverse channel apparatuses as described in any one of supplements 1-6, wherein when the transmitter comprises one inverse channel apparatus, the inverse channel apparatus is provided before an digital-to-analog converter of the transmitter, the inverse channel apparatus being configured to build an inverse channel of an original channel;

and when the transmitter comprises a plurality of inverse channel apparatuses, the inverse channel apparatuses are provided before the digital-to-analog converter of the transmitter, each of the inverse channel apparatuses being configured to build inverse channels of a part of original channels.

Supplement 9. A transmission system, comprising a transmitter and a receiver, the transmitter or receiver comprising one or a plurality of the inverse channel apparatuses as described in any one of supplements 1-6.

10. A nonlinear compensation method, comprising:

performing nonlinear additive damage calculation and nonlinear multiplicative damage calculation on input signals, so as to obtain signals containing nonlinear damage of the input signals on at least one polarization state; and calculating signals containing nonlinear damage and linear damage of the input signals on at least one polarization state according to the signals containing nonlinear damage of the input signals on at least one polarization state and a linear function of a channel.

Supplement 11. The method according to supplement 10, wherein the nonlinear coefficients of the inverse channel may be calculated first according to the channel configuration parameters of the inverse channel, then the nonlinear perturbation within the inverse channel is calculated according to the nonlinear coefficients of the inverse channel and the input signals, and finally signals containing nonlinear damage of the input signals on at least one polarization state are calculated according the nonlinear perturbation within the inverse channel and the input signals.

Supplement 12. The method according to supplement 11, wherein the channel configuration parameters of the inverse channel comprise optical fiber parameters, the optical fiber parameters comprising an attenuation factor $\alpha$ and/or a dispersion factor $\beta$ and/or a nonlinear factor $\gamma$; wherein the nonlinear coefficients of the inverse channel may be calculated according to inverted values of the optical fiber parameters.

Supplement 13. The method according to supplement 11, wherein the nonlinear perturbation within the inverse channel comprises nonlinear perturbation caused by intra-channel four-wave mixing (IFWM), intra-channel cross phase modulation (IXPM) and self-phase modulation (SPM);

and wherein,
the nonlinear perturbation caused by IFWM is:

$$\Delta_{h,IFWM,l} = j\sum_{m\neq 0}\sum_{n\neq 0} c(m,n)(H_{l+m}H_{l+n}H^*_{l+m+n} + H_{l+m}V_{l+n}V^*_{l+m+n}),$$

$$\Delta_{h,IFWM,l} = j\sum_{m\neq 0}\sum_{n\neq 0} c(m,n)(H_{l+m}H_{l+n}H^*_{l+m+n} + H_{l+m}V_{l+n}V^*_{l+m+n});$$

the nonlinear perturbation caused by IXPM is:

$$\phi_{h,IXPM,l} = \sum_{m\neq 0} c(m,0)(2|H_{l+m}|^2 + |V_{l+m}|^2),$$

$$\phi_{v,IXPM,l} = \sum_{m\neq 0} c(m,0)(2|V_{l+m}|^2 + |H_{l+m}|^2),$$

$$w_{hv,IXPM,l} = j\sum_{m\neq 0} c(m,0)H_{l+m}V^*_{l+m},$$

$$w_{vh,IXPM,l} = j\sum_{m\neq 0} c(m,0)V_{l+m}H^*_{l+m};$$

and the nonlinear perturbation caused by SPM is:

$$\phi_{h,SPM,l} = \phi_{v,SPM,l} = c(0,0)(|H_l|^2 + |V_l|^2);$$

where, c is a nonlinear coefficient of the inverse channel, m and n are relative moments, l is an absolute moment, H is an input signal on the horizontal polarization state, and V is an input signal on the vertical polarization state.

Supplement 14. The method according to supplement 11, wherein the signals containing nonlinear damage of the input signals on at least one polarization state are calculated according to the following formula:

$$\begin{bmatrix} H_{NL} \\ V_{NL} \end{bmatrix} = \begin{bmatrix} e^{j(\phi_{h,IXPM}+\phi_{h,SPM})} & w_{hv,IXPM} \\ w_{vh,IXPM} & e^{j(\phi_{v,IXPM}+\phi_{v,SPM})} \end{bmatrix} \begin{bmatrix} H + \Delta_{h,IFWM} \\ V + \Delta_{v,IFWM} \end{bmatrix},$$

or $$\begin{bmatrix} H_{NL} \\ V_{NL} \end{bmatrix} = \begin{bmatrix} \sqrt{1-|w_{vh,IXPM}|^2}\, e^{j(\phi_{h,IXPM}+\phi_{h,SPM})} & w_{hv,IXPM} \\ w_{vh,IXPM} & \sqrt{1-|w_{hv,IXPM}|^2}\, e^{j(\phi_{v,IXPM}+\phi_{v,SPM})} \end{bmatrix} \begin{bmatrix} H + \Delta_{h,IFWM} \\ V + \Delta_{v,IFWM} \end{bmatrix},$$

or $$\begin{bmatrix} H_{NL} \\ V_{NL} \end{bmatrix} = e^{j\phi_c} \begin{bmatrix} \sqrt{1-|w_{vh,IXPM}|^2}\, e^{j\phi_\Delta} & w_{hv,IXPM} \\ w_{vh,IXPM} & \sqrt{1-|w_{hv,IXPM}|^2}\, e^{-j\phi_\Delta} \end{bmatrix} \begin{bmatrix} H + \Delta_{h,IFWM} \\ V + \Delta_{v,IFWM} \end{bmatrix};$$

where, $\Delta_{h,IFWM}$ and $\Delta_{v,IFWM}$ are the nonlinear perturbation caused by IFWM, $\phi_{h,IXPM}$, $\phi_{v,IXPM}$, $w_{hv,IXPM}$ and $W_{vh,IXPM}$ are the nonlinear perturbation caused by IXPM, $\phi_{h,SPM}$ and $\phi_{v,SPM}$ are the nonlinear perturbation caused by SPM, $$\phi_c = \frac{\phi_{h,IXPM} + \phi_{v,IXPM}}{2} + \phi_{h,SPM}, \phi_\Delta = \frac{\phi_{h,IXPM} - \phi_{v,IXPM}}{2},$$

H is an input signal on the horizontal polarization state, and V is an input signal on the vertical polarization state.

Supplement 15. The method according to supplement 11, wherein the signals containing nonlinear damage and linear damage of the input signals on at least one polarization state are obtained by calculating according to the signals containing nonlinear damage of the input signals on at least one polarization state and a dispersion transfer function of the channel;

and wherein the signals containing nonlinear damage and linear damage of the input signals on at least one polarization state are calculated according to the following formula:

$$H_{IC} = H_{NL} \otimes h_{CD}^{-1};$$

$$V_{IC} = V_{NL} \otimes h_{CD}^{-}.$$

The invention claimed is:

1. An inverse channel apparatus, comprising an inverse nonlinear calculating unit and an inverse linear calculating unit, wherein,
the inverse nonlinear calculating unit is configured to perform nonlinear additive calculation and nonlinear multiplicative calculation on input signals, so as to obtain signals containing nonlinear damage of the input signals on at least one polarization state;
the inverse nonlinear calculating unit comprising:
an inverse nonlinear coefficient calculating module configured to calculate nonlinear coefficients of the inverse channel according to channel configuration parameters;
an inverse nonlinear perturbation calculating module configured to calculate nonlinear perturbation within the inverse channel according to the nonlinear coefficients of the inverse channel and the input signals; and
an inverse nonlinear adding and multiplying module configured to calculate signals containing nonlinear damage of the input signals on at least one polarization state according to the nonlinear perturbation within the inverse channel and the input signals;
and the inverse linear calculating unit is configured to calculate signals containing nonlinear damage and linear damage of the input signals on at least one polarization state according to the signals containing nonlinear damage of the input signals on at least one polarization state and a linear function of a channel.

2. The apparatus according to claim 1, wherein the channel configuration parameters comprise optical fiber parameters, the optical fiber parameters comprising an attenuation factor α and/or a dispersion factor β and/or a nonlinear factor γ;
and wherein the inverse nonlinear coefficient calculating module calculates the nonlinear coefficients of the inverse channel according to inverted values of the optical fiber parameters.

3. The apparatus according to claim 1, wherein the inverse nonlinear perturbation calculating module is configured to calculate nonlinear perturbation within the inverse channel caused by intra-channel four-wave mixing (IFWM), intra-channel cross phase modulation (IXPM) and self-phase modulation (SPM);

and wherein, the nonlinear perturbation caused by IFWM is:

$$\Delta_{h,IFWM,l} = j \sum_{m \neq 0} \sum_{n \neq 0} c(m,n)(H_{l+m}H_{l+n}H^*_{l+m+n} + H_{l+m}V_{l+n}V^*_{l+m+n}),$$

$$\Delta_{h,IFWM,l} = j \sum_{m \neq 0} \sum_{n \neq 0} c(m,n)(H_{l+m}H_{l+n}H^*_{l+m+n} + H_{l+m}V_{l+n}V^*_{l+m+n});$$

the nonlinear perturbation caused by IXPM is:

$$\phi_{h,IXPM,l} = \sum_{m \neq 0} c(m,0)(2|H_{l+m}|^2 + |V_{l+m}|^2),$$

$$\phi_{v,IXPM,l} = \sum_{m \neq 0} c(m,0)(2|V_{l+m}|^2 + |H_{l+m}|^2),$$

$$w_{hv,IXPM,l} = j \sum_{m \neq 0} c(m,0) H_{l+m} V^*_{l+m},$$

$$w_{vh,IXPM,l} = j \sum_{m \neq 0} c(m,0) V_{l+m} H^*_{l+m};$$

and the nonlinear perturbation caused by SPM is:

$$\phi_{h,SPM,l} = \phi_{v,SPM,l} = c(0,0)(|H_l|^2 + |V_l|^2);$$

where, c is a nonlinear coefficient of the inverse channel, m and n are relative moments, l is an absolute moment, H is an input signal on the horizontal polarization state, and V is an input signal on the vertical polarization state.

4. The apparatus according to claim 1, wherein the inverse nonlinear adding and multiplying module calculates the signals containing nonlinear damage of the input signals on at least one polarization state according to the following formula:

$$\begin{bmatrix} H_{NL} \\ V_{NL} \end{bmatrix} = \begin{bmatrix} e^{j(\phi_{h,IXPM}+\phi_{h,SPM})} & w_{hv,IXPM} \\ w_{vh,IXPM} & e^{j(\phi_{v,IXPM}+\phi_{v,SPM})} \end{bmatrix} \begin{bmatrix} H + \Delta_{h,IFWM} \\ V + \Delta_{v,IFWM} \end{bmatrix},$$

or $$\begin{bmatrix} H_{NL} \\ V_{NL} \end{bmatrix} = \begin{bmatrix} \sqrt{1-|w_{vh,IXPM}|^2} \, e^{j(\phi_{h,IXPM}+\phi_{h,SPM})} & w_{hv,IXPM} \\ w_{vh,IXPM} & \sqrt{1-|w_{hv,IXPM}|^2} \, e^{j(\phi_{v,IXPM}+\phi_{v,SPM})} \end{bmatrix} \begin{bmatrix} H + \Delta_{h,IFWM} \\ V + \Delta_{v,IFWM} \end{bmatrix},$$

or $$\begin{bmatrix} H_{NL} \\ V_{NL} \end{bmatrix} = e^{j\phi_c} \begin{bmatrix} \sqrt{1-|w_{vh,IXPM}|^2} \, e^{j\phi_\Delta} & w_{hv,IXPM} \\ w_{vh,IXPM} & \sqrt{1-|w_{hv,IXPM}|^2} \, e^{-j\phi_\Delta} \end{bmatrix} \begin{bmatrix} H + \Delta_{h,IFWM} \\ V + \Delta_{v,IFWM} \end{bmatrix};$$

where, $\Delta_{h,IFWM}$ and $\Delta_{v,IFWM}$ are the nonlinear perturbation caused by IFWM, $\phi_{h,IXPM}$, $\phi_{v,IXPM}$, $w_{hv,IXPM}$ and $w_{vh,IXPM}$ are the nonlinear perturbation caused by IXPM, $\phi_{h,SPM}$ and $\phi_{v,SPM}$ are the nonlinear perturbation caused by SPM, $$\phi_c = \frac{\phi_{h,IXPM} + \phi_{v,IXPM}}{2} + \phi_{h,SPM}, \quad \phi_\Delta = \frac{\phi_{h,IXPM} - \phi_{v,IXPM}}{2},$$

H is an input signal on the horizontal polarization state, and V is an input signal on the vertical polarization state.

5. The apparatus according to claim 1, wherein the inverse linear calculating unit is an inverse dispersion unit which calculates signals containing nonlinear damage and linear damage of the input signals on at least one polarization state according to the signals containing nonlinear damage of the input signals on at least one polarization state and a dispersion transfer function of the channel;

and wherein the inverse dispersion unit calculates signals containing nonlinear damage and linear damage of the input signals on at least one polarization state according to the following formula:

$$H_{IC} = H_{NL} \otimes h_{CD}^{-1};$$

$$V_{IC} = V_{NL} \otimes h_{CD}^{-1}.$$

6. A receiver, comprising one or a plurality of inverse channel apparatuses as claimed in claim 1, wherein when the receiver comprises one inverse channel apparatuses, the inverse channel apparatus is provided between an analog-to-digital converter and an adaptive equalization and polarization demultiplexer of the receiver, the inverse channel apparatus being configured to build an inverse channel of an original channel;

and when the receiver comprises a plurality of inverse channel apparatuses, the inverse channel apparatuses are provided between the analog-to-digital converter and the adaptive equalization and polarization multiplexer of the receiver, each of the inverse channel apparatuses being configured to build inverse channels of a part of original channels.

7. A transmitter, comprising one or a plurality of inverse channel apparatuses as claimed in claim 1, wherein when the transmitter comprises one inverse channel apparatus, the inverse channel apparatus is provided before an digital-to-analog converter of the transmitter, the inverse channel apparatus being configured to build an inverse channel of an original channel;

and when the transmitter comprises a plurality of inverse channel apparatuses, the inverse channel apparatuses are provided before the digital-to-analog converter of the transmitter, each of the inverse channel apparatuses being configured to build inverse channels of a part of original channels.

8. A transmission system, comprising a transmitter and a receiver, the transmitter or receiver comprising one or a plurality of the inverse channel apparatuses as claimed in claim 1.

9. A nonlinear compensation method, comprising performing inverse nonlinear calculation and performing inverse linear calculation, wherein, the performing inverse nonlinear calculation is to performing nonlinear additive damage calculation and nonlinear multiplicative damage calculation on input signals, so as to obtain signals containing nonlinear damage of the input signals on at least one polarization state;

the performing inverse nonlinear calculation comprising:
calculating nonlinear coefficients of the inverse channel according to channel configuration parameters;
calculating nonlinear perturbation within the inverse channel according to the nonlinear coefficients of the inverse channel and the input signals; and
calculating signals containing nonlinear damage of the input signals on at least one polarization state according to the nonlinear perturbation within the inverse channel and the input signals;

and the performing inverse linear calculation is to calculate signals containing nonlinear damage and linear damage of the input signals on at least one polarization state according to the signals containing nonlinear damage of the input signals on at least one polarization state and a linear function of a channel.

* * * * *

UNITED STATES PATENT AND TRADEMARK OFFICE
CERTIFICATE OF CORRECTION

| | |
|---|---|
| PATENT NO. | : 8,995,835 B2 |
| APPLICATION NO. | : 13/785366 |
| DATED | : March 31, 2015 |
| INVENTOR(S) | : Weizhen Yan et al. |

It is certified that error appears in the above-identified patent and that said Letters Patent is hereby corrected as shown below:

In the Claims

Column 23, Lines 5-6, In Claim 9, delete "performing" and insert -- perform --, therefor.

Signed and Sealed this
Twenty-first Day of July, 2015

Michelle K. Lee
*Director of the United States Patent and Trademark Office*